US012565840B1

(12) United States Patent
Mohammed et al.

(10) Patent No.: US 12,565,840 B1
(45) Date of Patent: Mar. 3, 2026

(54) AXIAL COMPRESSOR ROTOR ASSEMBLY

(71) Applicant: RTX Corporation, Farmington, CT (US)

(72) Inventors: Sohail Mohammed, Manchester, CT (US); Scot Webb, Gales Ferry, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/009,561

(22) Filed: Jan. 3, 2025

(51) Int. Cl.
*F01D 5/06* (2006.01)
*F01D 5/02* (2006.01)
*F01D 25/16* (2006.01)

(52) U.S. Cl.
CPC ............ *F01D 5/025* (2013.01); *F01D 5/063* (2013.01); *F01D 5/066* (2013.01); *F01D 25/16* (2013.01); *F05D 2220/32* (2013.01); *F05D 2240/24* (2013.01); *F05D 2240/54* (2013.01); *F05D 2240/60* (2013.01)

(58) Field of Classification Search
CPC .......... F01D 5/025; F01D 5/063; F01D 5/066; F01D 25/16; F05D 2220/32; F05D 2240/24; F05D 2240/54; F05D 2240/60
See application file for complete search history.

(56) References Cited

U.S. PATENT DOCUMENTS 2,749,086 A * 6/1956 Lombard ................ F01D 5/025 416/201 R
5,197,857 A 3/1993 Glynn
5,211,541 A * 5/1993 Fledderjohn ............ F01D 5/066 416/198 A
6,283,712 B1 * 9/2001 Dziech .................... F01D 5/088 415/115
6,763,654 B2 * 7/2004 Orlando .................... F01D 1/24 416/129
7,128,535 B2 * 10/2006 Sucin .................... F01D 11/001 415/199.1
7,513,102 B2 * 4/2009 Moniz ..................... F02K 3/072 60/268
10,052,716 B2 8/2018 Lloyd
2001/0036401 A1 * 11/2001 Harvey ................. F04D 29/681 415/115
2009/0148271 A1 * 6/2009 Alvanos .................. F01D 25/16 415/142

(Continued)

FOREIGN PATENT DOCUMENTS

CN 113714621 A 11/2021

*Primary Examiner* — Aaron R Eastman
(74) *Attorney, Agent, or Firm* — Getz Balich LLC

(57) ABSTRACT

An axial compressor rotor assembly includes a plurality of rotor disks extending axially along and circumferentially about a central axis between an upstream end and a downstream end. The rotor disks extend radially between an inner radial hub and an outer radial rim, and axially between a forward rim end and a rearward rim end. An airfoil extends spanwise from each of the rotor disks. A first rotor disk is disposed forward of a second rotor disk. The second rotor disk includes an interstage shaft. The interstage shaft includes an outer radial end, an inner radial end, and an arm. The arm extending axially from an outer surface of the interstage shaft to a distal end. The rearward rim end of the first rotor disk is fixedly joined to the distal end of the arm, for example, by inertia welding.

20 Claims, 10 Drawing Sheets

(56) References Cited

U.S. PATENT DOCUMENTS

2017/0030220 A1* 2/2017 Miller ..................... F01D 25/18
2017/0159493 A1* 6/2017 Snow ......................... F02C 3/04
2018/0010479 A1* 1/2018 Mason .................... F01D 21/02
2018/0320540 A1* 11/2018 Raper ................... F01D 11/001
2019/0120055 A1* 4/2019 Hachard ................... F01D 5/06
2019/0284999 A1* 9/2019 Giannakopoulos ... F04D 29/321
2020/0025030 A1* 1/2020 Merry ....................... F02C 7/36
2020/0217205 A1* 7/2020 Forcier ................. F04D 29/324
2022/0186619 A1* 6/2022 McCaffrey ............. F01D 5/025

* cited by examiner

AXIAL COMPRESSOR ROTOR ASSEMBLY

TECHNICAL FIELD

This disclosure relates to a compressor rotor assembly generally, and to an axial compressor rotor assembly, in particular.

BACKGROUND INFORMATION

Multi-stage axial compressor rotor assemblies with boltless construction are known generally to include a plurality of rotor stages arranged between ends having conical shafts. The two conical shafts are linked by a centrally positioned tie-shaft, which aligns with a central axis of the rotor assembly. In traditional boltless designs, the forward conical shaft is positioned in front of the first stage bladed rotor, and the rear conical shaft is placed behind the last stage bladed rotor, using interference (e.g., snap) fit engagement. In some applications, bearing systems may be required in the front end of the rotor assembly, resulting in a longer rotor assembly to accommodate the associated bearing systems. While these known rotor assemblies have various benefits, there is still room in the art for improvement.

SUMMARY

According to an aspect of the present disclosure, a rotor assembly for a gas turbine engine is provided. The rotor assembly includes a plurality of rotor disks extending axially along and circumferentially about a central axis between an upstream end and a downstream end. Each of the plurality of rotor disks extends radially between an inner radial hub and an outer radial rim. Each of the plurality of rotor disks extend axially between a forward rim end and a rearward rim end. An airfoil extending spanwise from each of the plurality of rotor disks from the outer radial rim to a tip of the airfoil. The plurality of rotor disks include a first rotor disk and a second rotor disk. The first rotor disk is disposed forward the second rotor disk. The second rotor disk includes an interstage shaft. The interstage shaft extends axially along and circumferentially about the central axis between an outer radial end and an inner radial end. The interstage shaft includes an arm extending axially from an outer surface of the interstage shaft to a distal end. The outer radial end extends from the outer radial rim of the second rotor disk. The inner radial end is radially inward of the first rotor disk. The interstage shaft tapers radially inward and axially along the central axis from the outer radial end to the inner radial end. The rearward rim end of the first rotor disk is fixedly joined to the distal end of the arm.

In any of the aspects or embodiments described above and herein, the interstage shaft includes an aperture extending from an inner surface of the interstage shaft to an outer surface of the interstage shaft. The aperture provides fluid communication between an exterior of the rotor assembly and an interior of the rotor assembly.

In any of the aspects or embodiments described above and herein, the rotor assembly includes a forward bearing assembly and a rearward bearing assembly. The forward bearing assembly is disposed proximate the inner radial end of the interstage shaft, and the rearward bearing is disposed proximate the downstream end.

In any of the aspects or embodiments described above and herein, the rearward rim end of the first rotor disk is fixedly joined to the distal end of the arm by inertia welding.

In any of the aspects or embodiments described above and herein, rotor assembly further includes a compressor section of the gas turbine engine. The rotor assembly is disposed within the compressor section. The compressor section may include a high pressure compressor. The rotor assembly may be disposed within the high pressure compressor.

In any of the aspects or embodiments described above and herein, each of the plurality of rotor disks comprise a bladed stage of the rotor assembly.

In any of the aspects or embodiments described above and herein, the airfoil is integrally formed with a respective one of the plurality of rotor disks.

In any of the aspects or embodiments described above and herein, the plurality of rotor disks includes a third rotor disk. The third rotor disk is disposed axially aft of the first rotor disk and the second rotor disk. The second rotor disk includes a coupling end, which engages a coupling element of the third rotor disk.

In any of the aspects or embodiments described above and herein, the rotor assembly further includes a rearward shaft and a tie shaft. The rearward shaft may be joined to the third rotor disk. The rearward shaft may include an outer radial end and an inner radial end. The rearward shaft may extend axially along and circumferentially about the central axis. The rearward shaft may taper radially inward from the outer radial end to the inner radial end. The inner radial end of the rearward shaft may be disposed at the downstream end. The tie shaft may extend axially along and circumferentially about the central axis, and may be coupled to the upstream end and the downstream end.

In any of the aspects or embodiments described above and herein, the arm extends circumferentially about the central axis, encircling at least a portion of the interstage shaft.

In any of the aspects or embodiments described above and herein, a load path of the rotor assembly is directed from the second rotor disk into the interstage shaft and away from the first rotor disk.

According to another aspect of the present disclosure, another rotor assembly for a gas turbine engine is provided. The rotor assembly comprises a first bladed rotor stage, a second bladed rotor stage, and an interstage shaft. The first bladed rotor stage extends axially along and circumferentially about a centerline. The second bladed rotor stage extends axially along and circumferentially about the centerline. The second bladed rotor stage is disposed axially aft of the first bladed rotor stage. The interstage shaft includes an outer radial end, an inner radial end, and an arm. The interstage shaft extends axially along and circumferentially about the centerline. The interstage shaft extends from an upstream end of the second bladed rotor stage towards the first bladed rotor stage. The interstage shaft tapers radially inward from the outer radial end to the inner radial end. The arm extends axially from the outer radial end of the interstage shaft towards the first bladed rotor stage. The first bladed rotor stage is fixedly joined to the arm.

In any of the aspects or embodiments described above and herein, the first bladed rotor stage is fixedly joined to the arm by inertia welding.

In any of the aspects or embodiments described above and herein, rotor assembly further includes a compressor section of the gas turbine engine. The rotor assembly is disposed within the compressor section. The compressor section may include a high pressure compressor. The rotor assembly may be disposed within the high pressure compressor.

In any of the aspects or embodiments described above and herein, rotor assembly further includes a third bladed rotor stage. The third bladed rotor stage is disposed axially downstream of the first bladed rotor stage and the second bladed rotor stage. The third bladed rotor stage is coupled to a downstream end of the second bladed rotor stage. The third bladed rotor stage is removably coupled to the second bladed rotor stage.

According to still another aspect of the present disclosure, a compressor rotor assembly for a gas turbine engine is provided. The compressor rotor assembly includes a compressor section, a forward bearing assembly, a rearward bearing assembly, a plurality of rotor stages, and a load path. The compressor section includes an upstream end and a downstream end. The forward bearing assembly is disposed at the upstream end, and the rearward bearing assembly is disposed at the downstream end. The plurality of rotor stages includes a first rotor stage and a second rotor stage. The plurality of rotor stages extend axially along and circumferentially about an axial centerline between the upstream end and the downstream end. Each of the plurality of rotor stages extend radially between an inner radial hub and an outer radial rim. Each of the plurality of rotor stages include an airfoil extending spanwise from the outer radial rim to a tip. The first rotor stage is disposed forward of the second rotor stage. The second rotor stage includes an interstage shaft. The interstage shaft includes an outer radial end, an inner radial end, and an arm. The interstage shaft extends axially between the first rotor stage and the second rotor stage. The outer radial end extends axially from an upstream end of the second rotor stage. The interstage shaft tapers radially inward from the outer radial end to the inner radial end. The arm extends axially from the interstage shaft towards the downstream end of the first rotor stage. The first rotor stage is attached to the arm. The load path of the assembly is directed into the interstage shaft and away from the first rotor stage.

In any of the aspects or embodiments described above and herein, the first rotor stage is attached to the arm by inertia welding.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
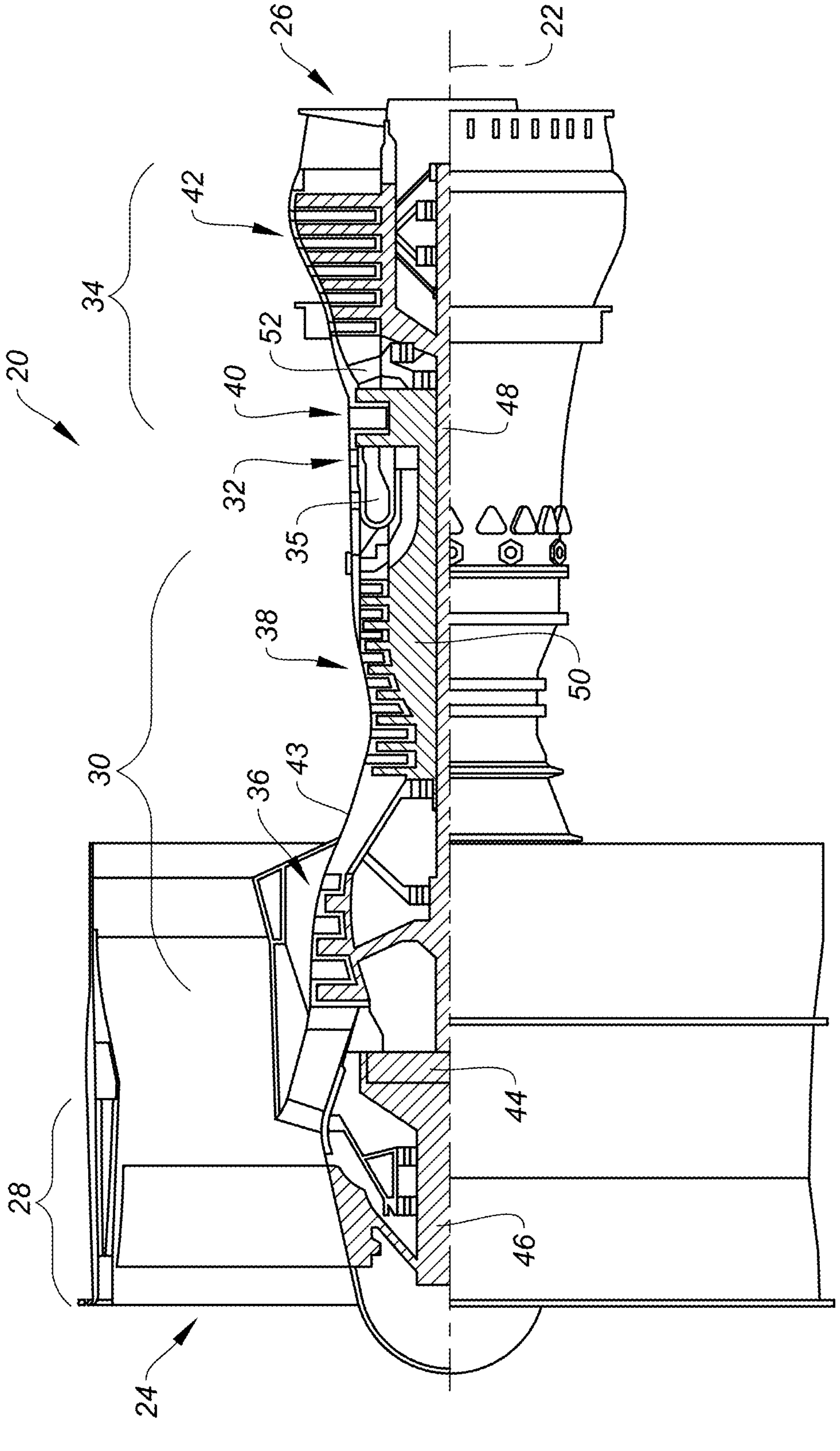
FIG. 1 is a partially sectioned diagrammatic view of a gas turbine engine according to an embodiment of the present disclosure.

FIG. 1 depicts a partially sectioned diagrammatic view of a gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes a combustor 35. The compressor section includes a low-pressure compressor (LPC) 36 and a high-pressure compressor (HPC) 38. The turbine section 34 includes a high-pressure turbine (HPT) 40 and a low-pressure turbine (LPT) 42. The engine may be described as having an outer casing 43 disposed radially outside of the compressor, combustor, and turbine sections 30, 32, 34 that defines an outer radial boundary of the core gas path through the engine. The configuration of the outer casing 43 may vary along the core gas path (e.g., a first set of components forming the outer casing 43 within the compressor section, a different set of components forming the outer casing 43 within the combustor section, and so on. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low-speed shaft 48. The HPC 38 is connected to and driven by the HPT 40 through a high-speed shaft 50. The terms “forward”, “leading”, “aft, “trailing” are used herein to indicate the relative position of a component or surface. As core gas air passes through the engine 20, a “leading edge” of a stator vane or rotor blade encounters core gas air before the “trailing edge” of the same. In a conventional axial engine such as that shown in FIG. 1, the fan section 28 is “forward” of the compressor section 30 and the turbine section 34 is “aft” of the compressor section 30. The terms “inner radial” and “outer radial” refer to relative radial positions from the engine centerline 22. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration, including the two-spool engine configuration shown, and may be utilized with single spool gas turbine engines as well as three spool gas turbine engines and the like.

Figure 2:
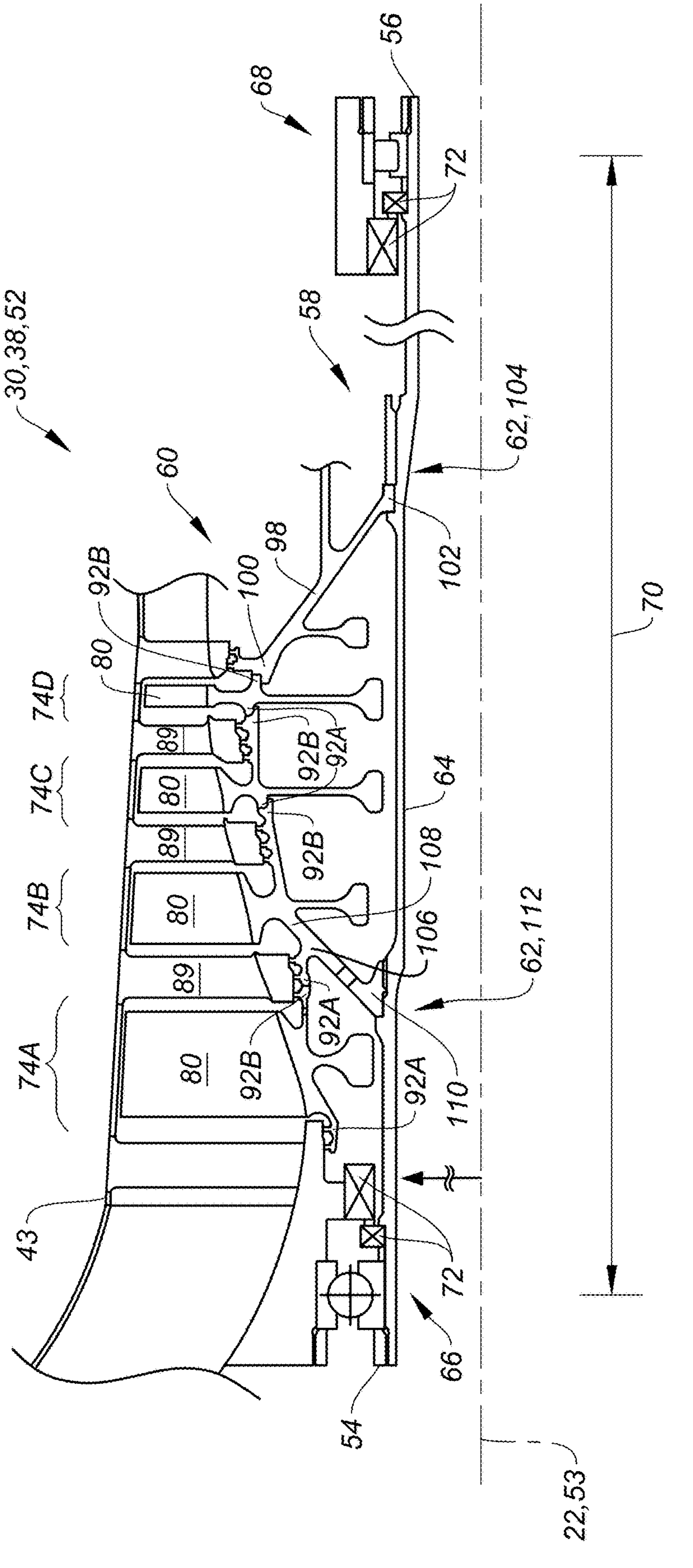
FIG. 2 is a schematic side sectional view of a rotor assembly according to an embodiment of the present disclosure.

FIG. 2 schematically depicts a rotor assembly 52 according to an embodiment of the present disclosure. The rotor assembly 52 may be disposed in the compressor section 30, for example, in the high pressure compressor (HPC) 38. Other locations of the rotor assembly are not meant to be precluded. The rotor assembly 52 extends axially along a central axis 53 between an upstream end 54 and a downstream end 56. The rotor assembly 52 extends radially between an inner diameter 58 and an outer diameter 60. The axis 53 may be a rotational axis of one or more components (e.g., rotors) of the gas turbine engine 20. The axis 53 may be the engine centerline 22 in general.

The rotor assembly inner diameter 58 includes an engagement section 62 for removably coupling the rotor assembly 52 to a tie shaft 64 in a threaded engagement, a splined engagement, or the like. The tie shaft 64 extends circumferentially about (e.g., completely around) the axis.

The rotor assembly 52 includes a forward bearing assembly 66 and a rearward bearing assembly 68. The forward bearing assembly 66 is positioned within the rotor assembly 52 axially spaced from the upstream end 54. The rearward bearing assembly 68 is positioned within the rotor assembly 52 axially spaced from the downstream end 56. A bearing span 70 extends between axial midpoints of the forward bearing assembly 66 and the rearward bearing assembly 68. The forward bearing assembly 66 may comprise a ball bearing assembly and the rearward bearing assembly 68 may comprise a roller bearing assembly. Other bearing assemblies are not meant to be precluded such as duplex, tandem, intershaft and/or tapered bearings. The forward bearing assembly 66, rearward bearing assembly 68, or both may include radial and/or axial sealing elements 72, such as a ring seal, labyrinth (e.g., knife-edge) seal, brush seal, carbon seal, and the like.

Figure 2A:
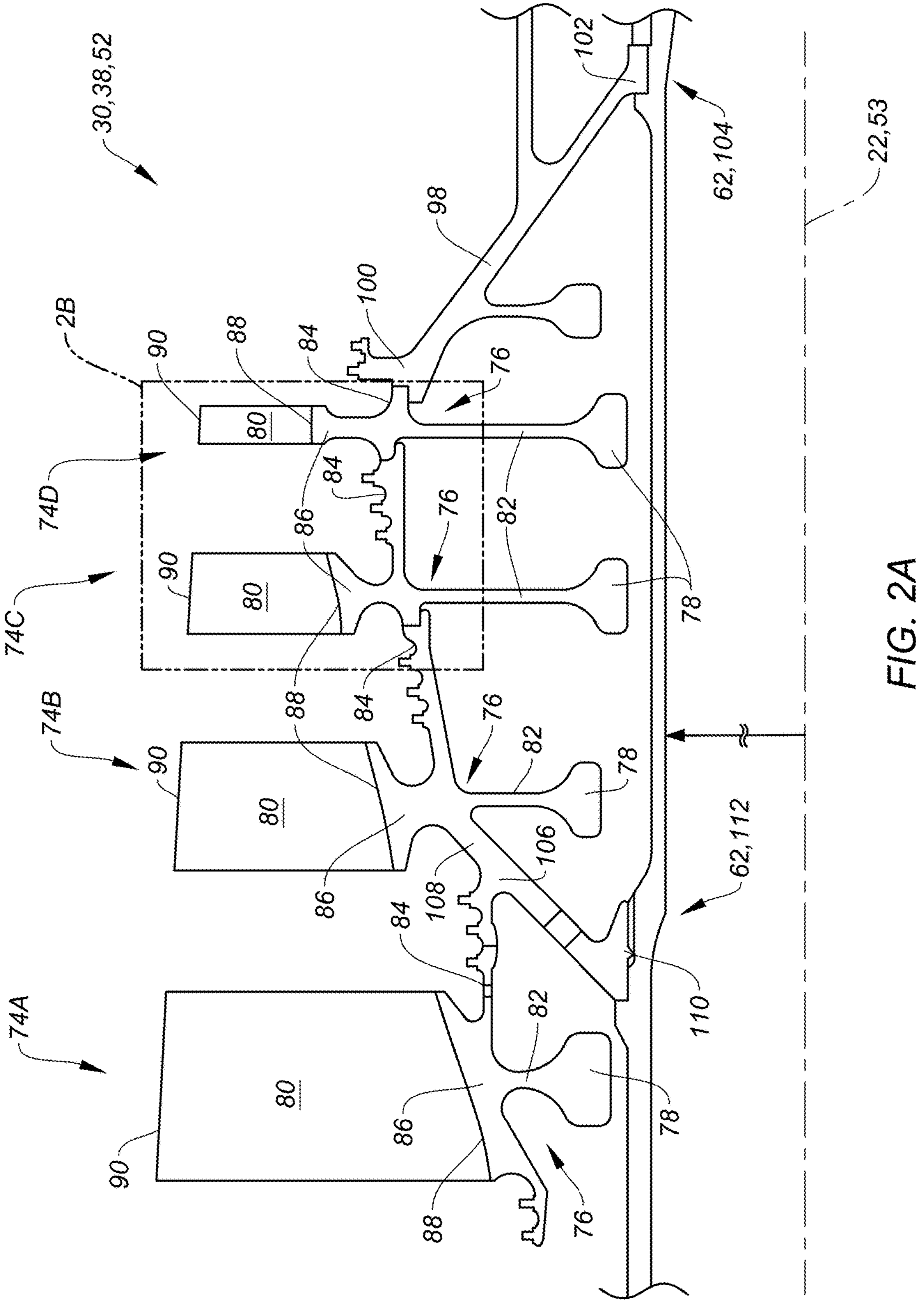
FIG. 2A is a schematic side sectional view of a portion of the rotor assembly of FIG. 2.

The outer diameter 60 of the rotor assembly 52 includes a plurality of axially distributed rotors 74A-D (referred to generally as 74). With additional reference to FIG. 2A, Each of the plurality of rotors 74 comprises a rotor disk 76 (e.g., an annular body) extending circumferentially about (e.g., completely around) the axis 53. Each of the plurality of rotors 74 includes an inner radial hub 78 that carries one or more rotatable blades or airfoils 80. An imperforate web section 82 of each rotor 74 extends radially outwards from, and is mounted to, a respective hub 78. The web section 82 extends radially outward to an outer radial rim 84. The rotatable blades or airfoils 80 are rotatable about the engine axis in the core gas path. Each airfoil 80 includes a platform 86 connected to the rim 84 and each airfoil 80 extends spanwise from a base 88 to a tip 90. As illustrated in FIGS. 2 and 2A, each rotor 74 is a blisk or integrally bladed rotor (IBR) in which the airfoils 80 are integrally formed with the rim 84. In some embodiments, the airfoil(s) 80 are of a separate construction which is mechanically coupled to the rotors 74, including using dovetail/slot joining methods or by liner friction welding.

Figure 2B:
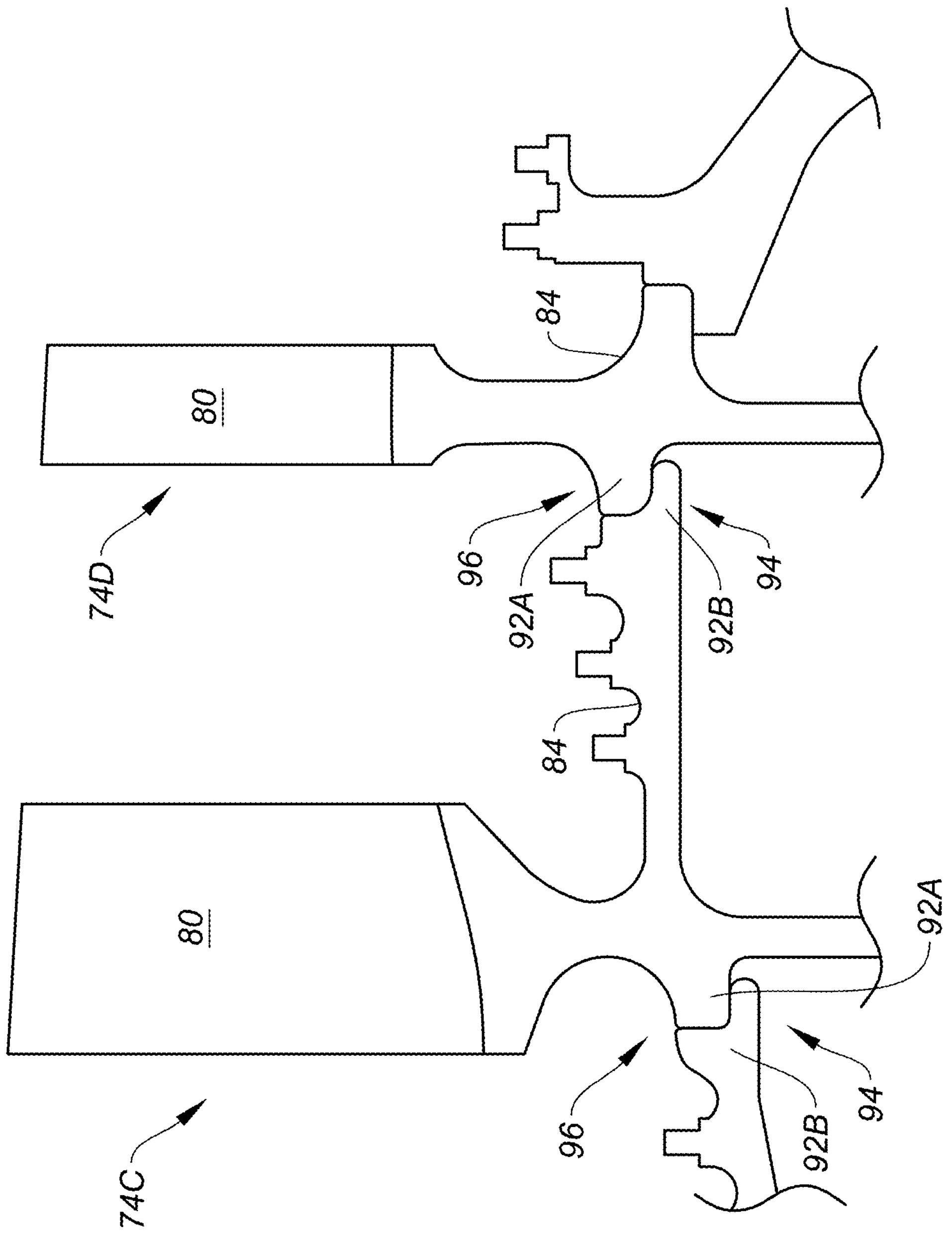
FIG. 2B is an enlarged schematic side sectional view of a portion of the rotor assembly of FIG. 2A.

Each rotor 74 of FIG. 2 forms a single bladed rotor stage for a high pressure compressor rotor of the HPC 38. A plurality of vanes 89 extend inwards from the outer casing 43 radially outboard of the HPC 38 along the central axis 53 between a pair of rotors 74 to direct flow (e.g., primary airflow) rearwards in the rotor assembly 52. Generally, labyrinth (e.g., knife-edge) seals 118 (See e.g., FIG. 3) are positioned radially between the vane 89 and the respective rotor stage 74 to restrict higher pressure air from flowing forward into lower pressure stages. Each rotor 74 extends axially between circumferentially extending rim ends 92 (e.g., a forward rim end 92A and a rearward rim end 92B), and are coupled to adjacent rotors 74 (e.g., the forward rim end 92A of the rotor stage 74C is coupled to the rearward rim end 92B of the upstream rotor stage 74B). While the embodiment depicted in FIG. 2 illustrates four (4) bladed rotor stages of the rotor assembly 52, the rotor assembly 52 of the present disclosure may include any number of bladed rotor stages. Apart from the connection between the first bladed rotor stage 74A and the second rotor stage 74B, adjacent rotor stages 74B-D may be coupled to an upstream and/or downstream rotor stages by way of a removable mechanical connection (e.g., interference fit, mechanical fasteners, and the like). By way of example and with additional reference to FIG. 2B, a coupling end 94 of the upstream third rotor stage 74C may fit within and engage a coupling element 96 of the downstream fourth rotor stage 74D to form a removably couplable mechanical connection therebetween.

Referring to FIGS. 2 and 2A, the rearward rotor stage (e.g., fourth rotor stage) 74D is removably coupled (e.g., bolted, interference engagement) to a rearward shaft 98. The rearward shaft 98 extends axially along the axis 53, tapering radially inward from an outer radial end 100 to an inner radial end 102 disposed at a downstream portion 104 of the rotor assembly inner diameter 58 (e.g., at the engagement section 62). The rearward bearing assembly 68 may be disposed proximate (e.g., downstream of) the inner radial end 102 of the rearward shaft 98 and/or adjacent the downstream end 56. FIG. 2 illustrates the second rotor stage 74B includes an interstage shaft 106. The interstage shaft 106 and the second rotor stage 74B may be of an integral (e.g., unitary) construction. For example, the interstage shaft 106 may be integrally connected to (e.g., forged or manufactured with) the second stage rotor 74B. The interstage shaft 106 may alternatively be of a separate construction from the second stage rotor 74B, which may be removably coupled thereto. For example, the interstage shaft 106 may be assembled to the second stage rotor 74B using an interference engagement. The interstage shaft 106 extends axially along the axis 53, tapering radially inward and forward from an outer radial end 108 to an inner radial end 110 disposed at an upstream portion 112 of the rotor assembly inner diameter 58. (e.g., at the engagement section 62). The forward bearing assembly 66 may be disposed proximate (e.g., forward of) the inner radial end 110 of the interstage shaft 106. As depicted in FIG. 2, the inner radial end 110 of the interstage shaft 106 is positioned radially inward of and adjacent (e.g., proximate) the first rotor stage 74A. The interstage shaft inner radial end 110 and/or the rearward shaft inner radial end 102 may be coupled to the tie shaft 64 at the engagement section 62 using a threaded joint. The rearward shaft 98, the interstage shaft 106, or both may be configured as conical shafts having a frustoconical geometry.

The rearward shaft 98 and the interstage shaft 106 are configured to provide a direct load path for driving the rotors and blades supported thereon, described in further detail below. Except for the cantilevered, upstream (e.g., forward) first bladed rotor stage 74A, the remaining bladed rotor stages 74B-D of the rotor assembly 52 may be axially compressed, for example, between the interstage shaft 106 and the rearward shaft 98 mounted on the tie shaft 64. FIGS. 2 and 2A depict the interstage shaft 106 and the rearward shaft 98 are held in place by the threaded engagement with the tie shaft 64, axially abutting (e.g., sandwiching) the second bladed rotor stage 74B, the third bladed rotor stage 74C, and the fourth bladed rotor stage 74D. The present disclosure, however, is not limited to the foregoing exemplary mounting configuration of the bladed rotor stages 74 at (e.g., on, adjacent, or proximate) the tie shaft 64.

Figure 3:
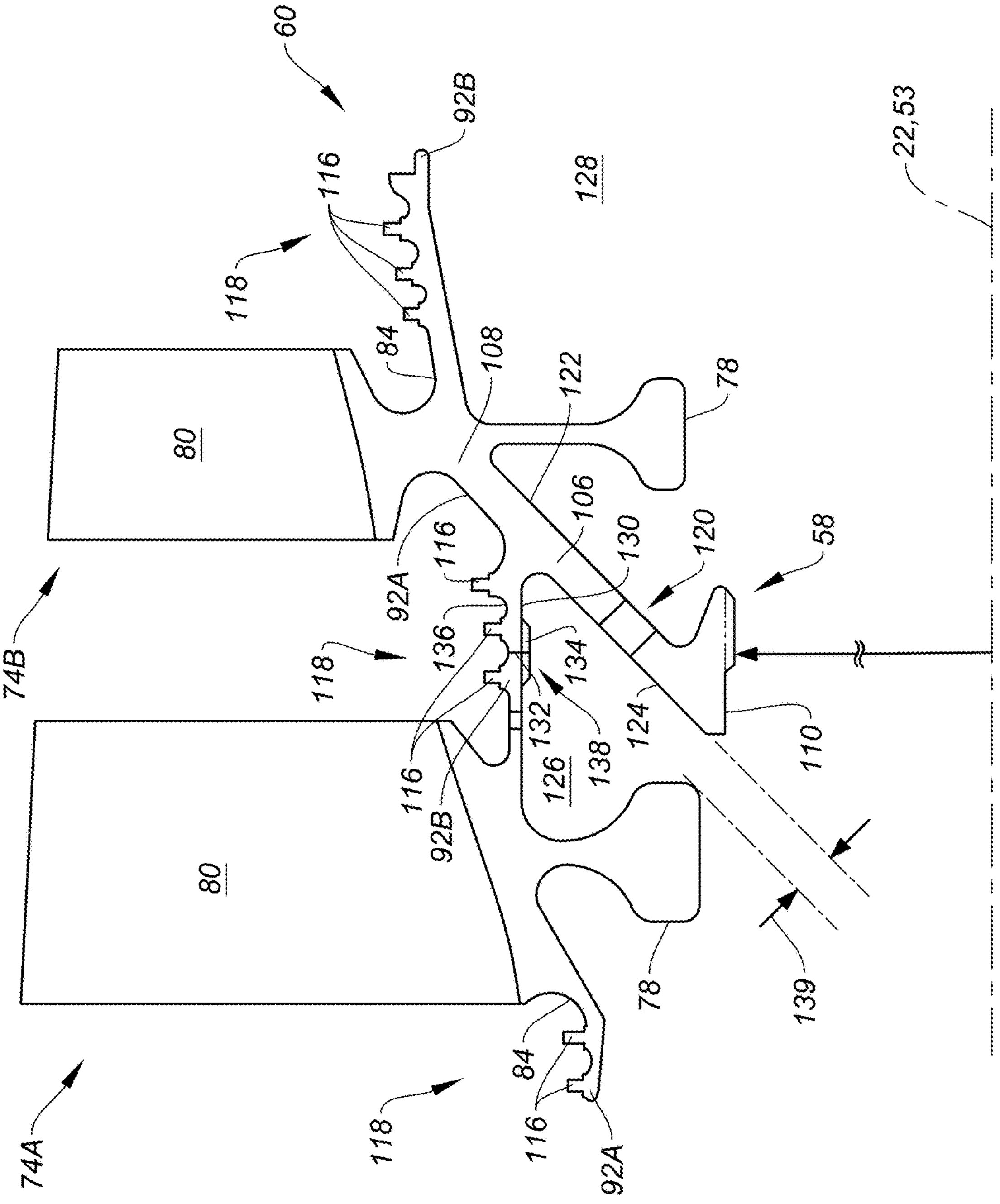
FIG. 3 is a schematic side sectional view of a portion of a rotor assembly according to an embodiment of the present disclosure.

With additional reference to FIG. 3, a portion of the rotor assembly 52 of FIG. 2 is depicted, displaying two adjacent rotor stages, a first (e.g., forward) rotor stage 74A and a second (e.g., aft) rotor stage 74B. The first rotor stage 74A and the second rotor stage 74B extend radially between the hub 78 and the rim 84. The first rotor stage 74A and the second rotor stage 74B extend axially along the centerline 53 between rim ends 92A and 92B. One or both rim ends 92A and 92B of the first rotor stage 74A, the second rotor stage 74B, or both may include a plurality of protrusions 116 extending radially from the rim 84 forming a knife edge seal 118. The protrusions 116 of the knife edge seal 118 may extend from the rim 84 at an acute angle.

The second rotor stage 74B includes the interstage shaft 106, which may be integrally formed with the second rotor stage 74B. The interstage shaft 106 of FIG. 3 extends axially along the centerline 53 between the first rotor stage 74A and the second rotor stage 74B. The interstage shaft 106 extends from the outer radial end located at the rim 84 of the second rotor stage 74B inwardly along the centerline towards the first rotor stage 74A. The interstage shaft 106 includes one or more apertures 120, an inner surface 122 and an outer surface 124. The aperture(s) 120 may be formed on the interstage shaft 106 extending from the inner surface 122 of the interstage shaft 106 to the outer surface 124 of the interstage shaft 106, providing fluid communication between a forward exterior 126 of the rotor assembly 52 and an aft interior 128 of the rotor assembly 52. An arm 130 extends outward from the outer surface of the interstage shaft 106 to a distal end 132. The arm 130 may or may not be parallel to the central axis 53. The arm 130 may extend from the outer surface at (e.g., near, adjacent, or proximate) the interstage shaft outer radial end 108. The arm 130 may extend circumferentially about the centerline 53, encircling (e.g., circumscribing) at least a portion of the interstage shaft 106. The arm 130 is disposed radially outboard of the interstage shaft 106. The arm 130 includes an inner surface 134 and an outer surface 136. One or more protrusions 116 may extend radially from the outer surface 136, creating knife edge seal 118 for the arm 130.

The arm 130 of FIG. 3 may be connected, coupled, fixedly joined, or otherwise attached to the rim end 92 of the first rotor stage 74A (e.g., rearward rim end 92B). In some embodiment, the arm 130 and the first rotor stage 74A may be fixedly joined via a welded joint 138, such as an inertia welded joint (e.g., solid state bonding). In some embodiments, one or more of the first rotor stage 74A, interstage shaft 106, arm 130, and second rotor stage 74B may be configured in a monolithic (e.g., integral, unitary) construction. For example, the first rotor stage 74A, interstage shaft 106, and arm 130 may be constructed separate from second rotor stage 74B, as shown in the alternate embodiment of FIG. 3A.

Figure 3A:
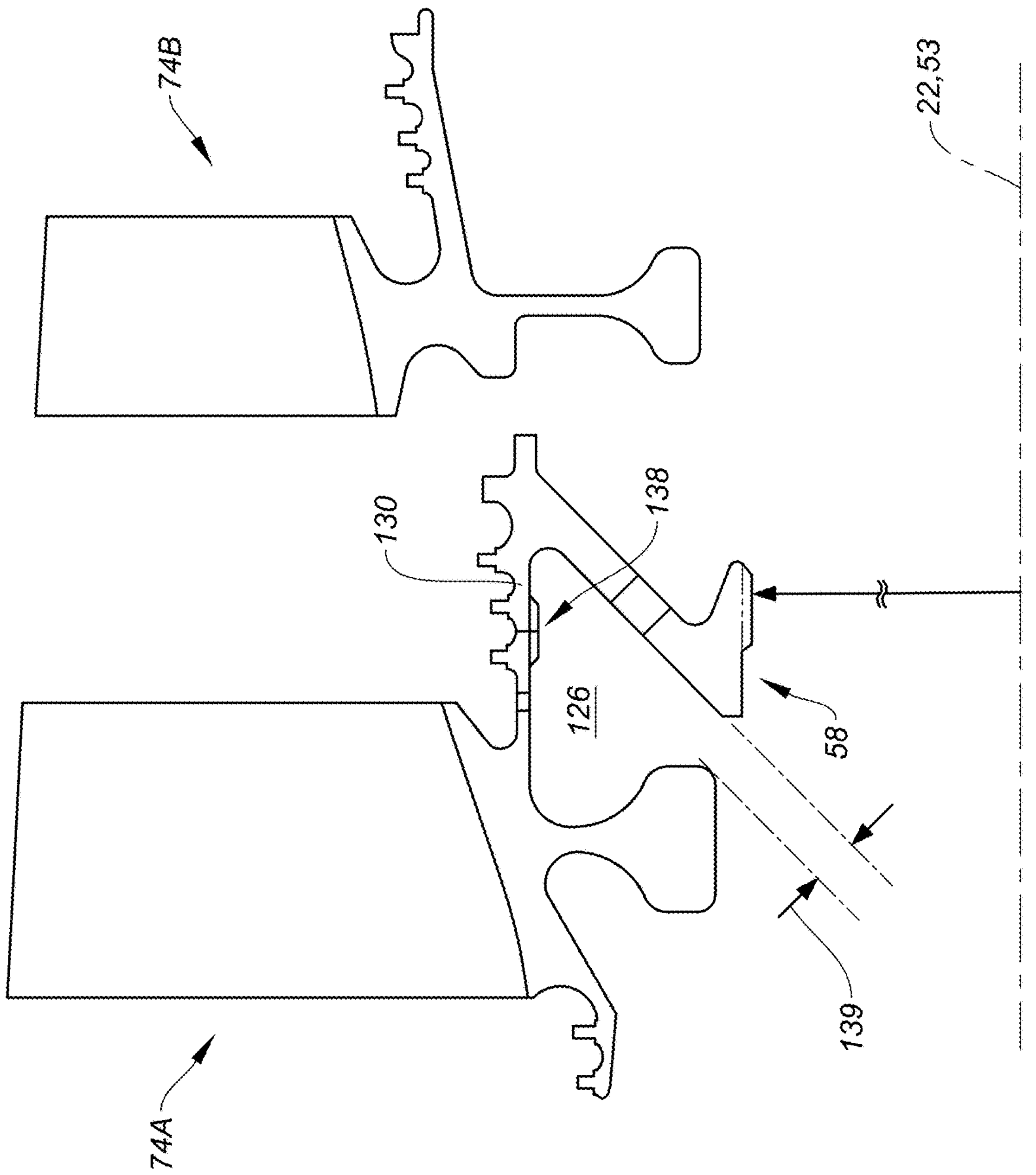
FIG. 3A is a schematic side sectional view of a portion of a rotor assembly according to an embodiment of the present disclosure.

Referring to FIGS. 3 and 3A, a clearance gap 139 is formed between the first rotor stage 74A and interstage shaft 106 at the inner diameter 58 of the rotor assembly 52. Clearance gap 139 provides sufficient separation (e.g., tooling access) to enable entry and movement of tooling within the forward exterior 126 such that milling operations, turning operations, and the like may be performed on surfaces localized within the forward exterior 126. For example, clearance gap 139 provides sufficient space to remove raised material from the inner surface 134 of the arm 130 at or near the welded joint 138.

Figure 4:
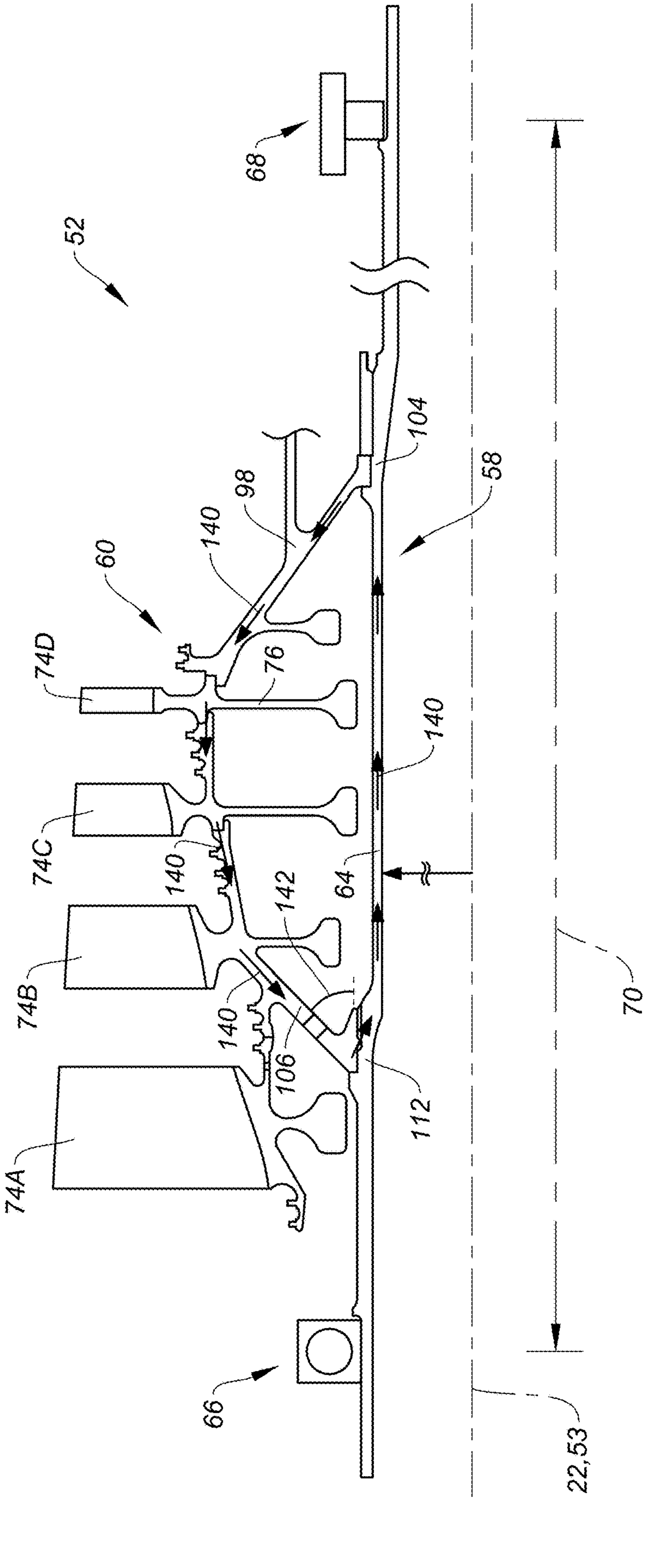
FIG. 4 is a schematic side sectional view of a rotor assembly according to an embodiment of the present disclosure.

Referring now to FIG. 4, a load (e.g., a stack load) path 140 is depicted extending within the rotor assembly 52 of the present disclosure along the bearing span 70 formed between the forward bearing assembly 66 and the rearward bearing assembly 68. The load path 140 extends axially along the tie shaft 64 between the upstream portion 112 and the downstream portion 104 of the inner diameter 58. The load path 140 extends along from the rotor assembly inner diameter 58 to the rotor assembly outer diameter 60 along a length of the rearward shaft 98 and axially upstream along the outer diameter 60 through the aftmost rotor stages (e.g., the fourth rotor stage 74D and the third rotor stages 74C) towards the second rotor stage 74B. The load path 140 is directed from the second rotor stage 74B (e.g., through rotor disk 76) into the interstage shaft 106 and away from the first rotor stage 74A. The interstage shaft 106 of the present disclosure thereby redirects the load path 140 towards the inner diameter 58, bypassing the first rotor stage 74A. The rotor assembly 52 of the present disclosure therefore positions the interstage shaft 106 aft of the first rotor stage 74A, providing increased space (e.g., clearance) for improved bearing system and related component design for advanced aircraft applications.

An angle 142 of the interstage shaft 106 may be adjusted as necessary to provide a shorter interstage shaft 106 length compared to rotor assemblies where the load path would pass through the first rotor stage. The angle 142 of the interstage shaft 106 may be, for example, between thirty (30) degrees and forty-five (45) degrees.

The interstage shaft 106 of the present disclosure which is disposed between first and second rotor stages 74A, 74B of the rotor assembly 52 thus increases space on tie shaft 64 forward of the first rotor stage rotor 74A, specifically the hub 78 of the first rotor stage 74A (FIG. 3), enabling additional clearance and/or space to mount additional advanced bearing systems and related hardware, thereby improving rotor load capacity.

Figure 6:
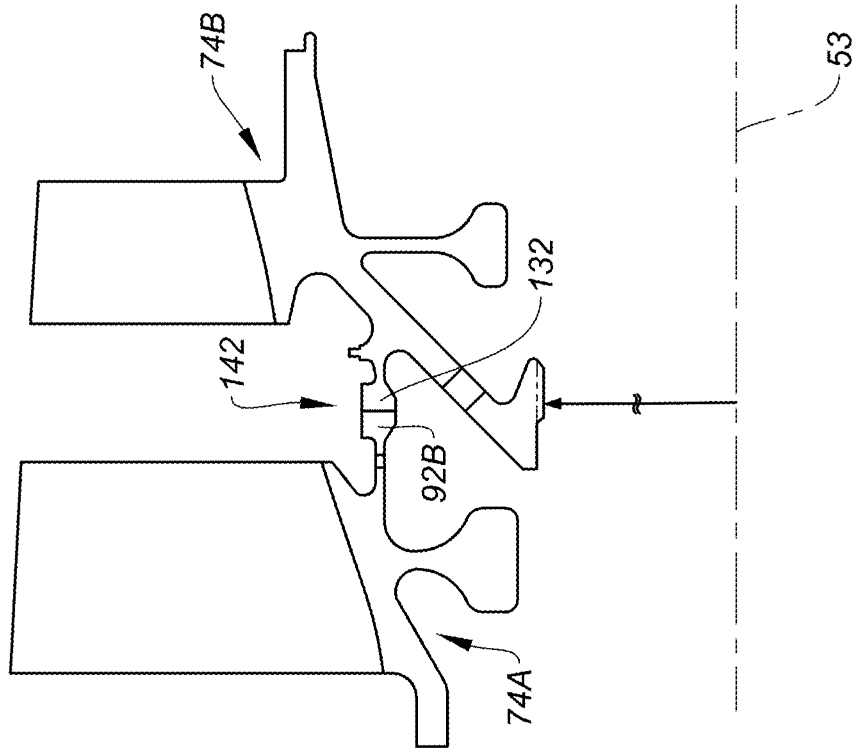
FIG. 6 is a schematic side sectional view of a portion of a rotor assembly according to an embodiment of the present disclosure, during assembly.
Figure 5:
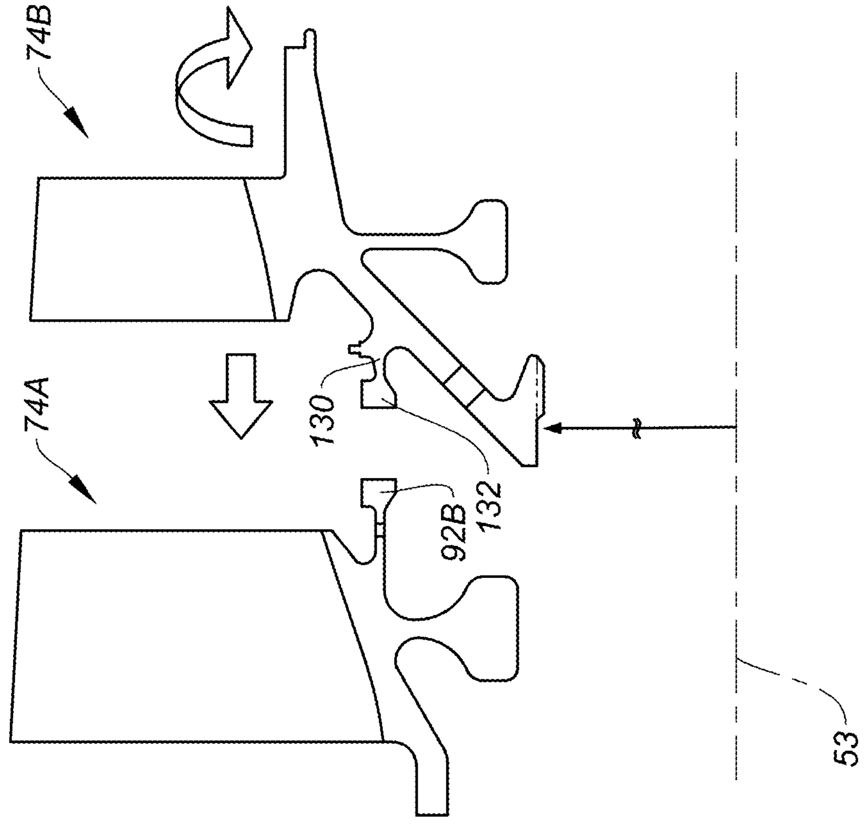
FIG. 5 is a schematic side sectional view of a portion of a rotor assembly according to an embodiment of the present disclosure, during assembly.

Referring now to FIGS. 5-8, a method of assembling the rotor assembly of the present disclosure is depicted. Referring to FIG. 5, the first rotor stage 74A and the second rotor stage 74B with the interstage shaft 106 are depicted in a machined (e.g., rough machined) condition prior to joining. The first rotor stage 74A and second rotor stage 74B may be oriented along the central axis 53 such that the aft rim end 92B of the first rotor stage 74A is adjacent and radially aligned with the distal end 132 of the arm 130. During welding operations, either of the first rotor stage 74A or the second rotor stage 74B may be held stationary while the opposing stage (e.g., the second rotor stage 74B or the first rotor stage 74A) may be rotated along the central axis 53 using, for example, a flywheel. For clarity purposes, the method will be described herein using the first rotor stage 74A as the stationary structure and the second rotor stage 74B as the rotating structure. Upon reaching a desired rotational speed, the second rotor stage 74B is disengaged from the flywheel and urged against the first rotor stage 74A, such that the aft rim end 92B of the first rotor stage contacts the distal end 132 of the arm 130. Referring to FIG. 6, friction generated between the first rotor stage 74A and the second rotor stage 74B will fixedly join the first rotor stage rim end 92B to the distal end 132 of the arm 130, producing a welded section 142 therebetween.

Figure 7:
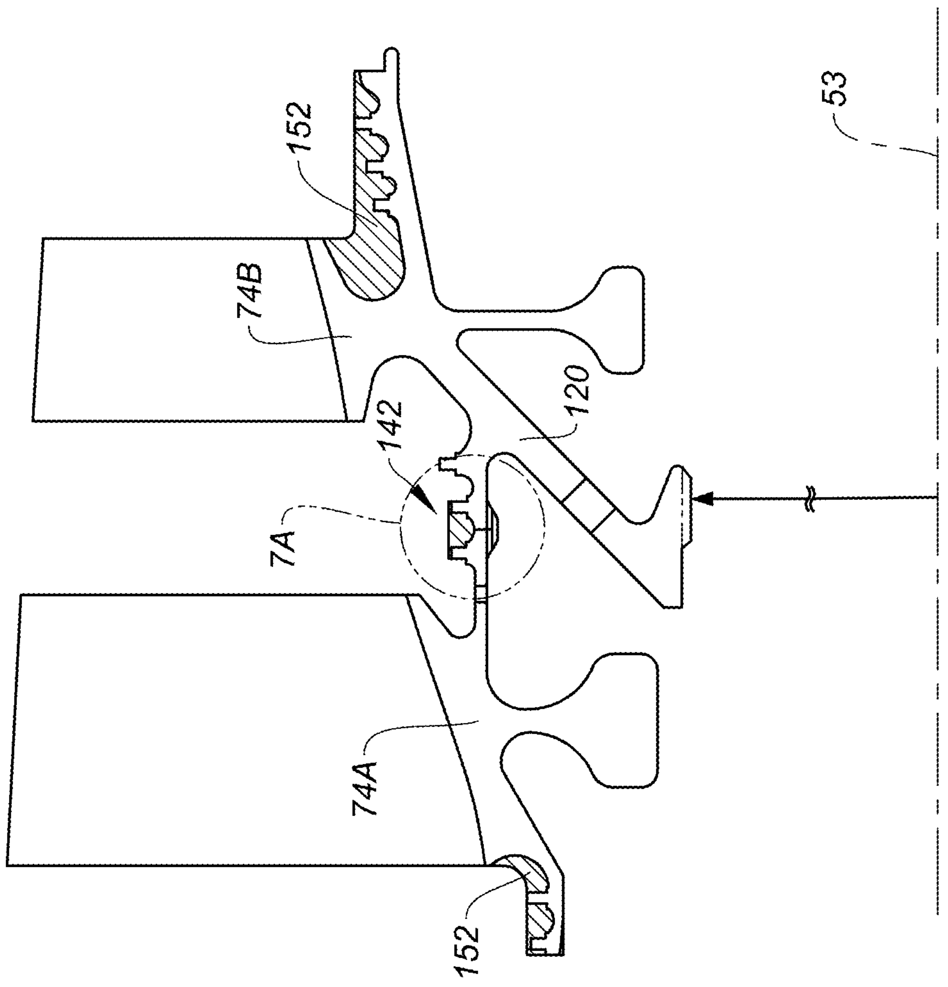
FIG. 7 is a schematic side sectional view of a portion of a rotor assembly according to an embodiment of the present disclosure, during assembly.
Figure 7A:
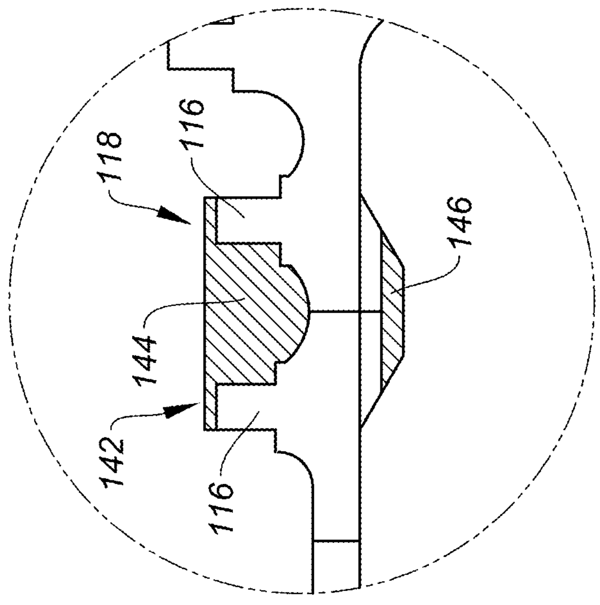
FIG. 7A is an enlarged schematic side sectional view of a portion of a rotor assembly of FIG. 7.
Figure 8:
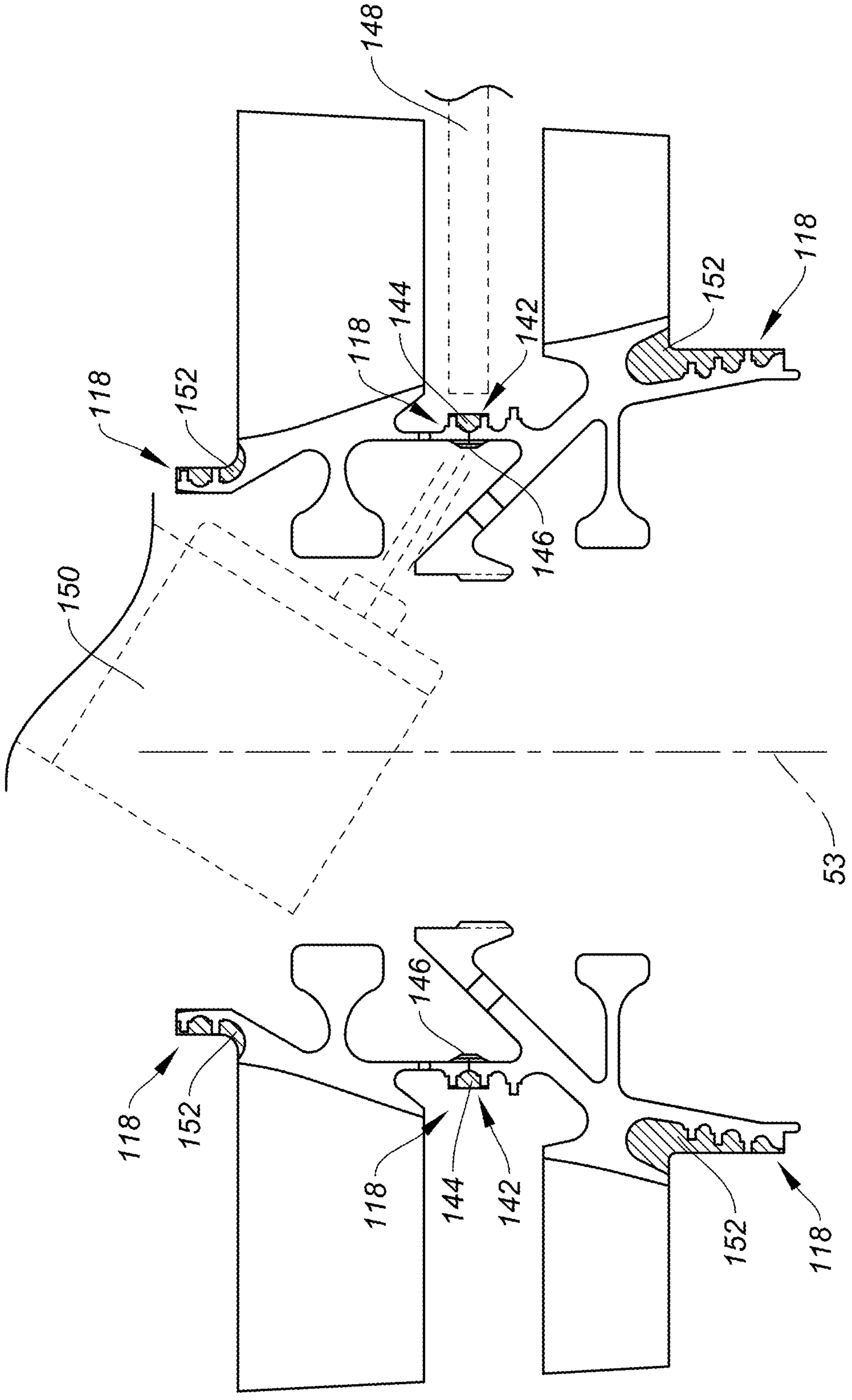
FIG. 8 is a schematic side sectional view of a portion of a rotor assembly according to an embodiment of the present disclosure, during assembly.

Referring now to FIGS. 7 and 7A, the first rotor stage 74A and the second rotor stage 74B after joining can subsequently be processed using a machining process. Examples of machining processes include, but are not limited to, a milling process, a turning process, a laser machining (e.g., ablation) process, a water-jet guided laser (WJGL) machining process, an abrasive water jet (AWJ) machining process, an electron beam machining process, and a mechanical drilling process. An outer machining area 144 of the welded section 142, as well as an inner machining area 146 of the welded section 142 may be machined away to provide any desired finished surface. For example, the outer machining area 144 may be removed to form one or more protrusions 116, forming the knife edge seal 118 of the welded section 142. With additional reference to FIG. 8, an outer tooling envelope 148 may be used to provide necessary clearance for finishing the outer machining area 144 of the welding section 142. Similarly, an inner tooling envelope 150 may be used to provide necessary clearance for finishing the inner machining surface 146 of the welded section 142. In addition to finishing the welded section 142, one or more outer radial machining surfaces 152 of the first rotor section 74A and the second rotor section 74B may be machined away to provide the desired finished surface. After processing is completed, the knife edge seals 118 may be treated using a post-processing coating.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

What is claimed is:

1. A rotor assembly for a gas turbine engine, comprising:

a plurality of rotor disks extending axially along and circumferentially about a central axis between an upstream end and a downstream end, each of the plurality of rotor disks extending radially between an inner radial hub and an outer radial rim, each of the plurality of rotor disks extending axially between a forward rim end and a rearward rim end, each of the plurality of disks including an airfoil extending spanwise from the outer radial rim to a tip, the plurality of rotor disks comprising a first rotor disk and a second rotor disk, the first rotor disk disposed forward the second rotor disk, the second rotor disk including an interstage shaft;

the interstage shaft extending axially along and circumferentially about the central axis between an outer radial end and an inner radial end, the outer radial end extending from the outer radial rim of the second rotor disk, the inner radial end radially inward of the first rotor disk, the interstage shaft tapering radially inward and axially along the central axis from the outer radial end to the inner radial end, the interstage shaft including an arm extending axially from an outer surface of the interstage shaft to a distal end, and the arm disposed radially between the outer radial end and the inner radial end of the interstage shaft;

wherein the rearward rim end of the first rotor disk is fixedly joined to the distal end of the arm.

2. The rotor assembly of claim 1, wherein the interstage shaft includes an aperture extending from an inner surface of the interstage shaft to the outer surface of the interstage shaft, the aperture providing fluid communication between an exterior of the rotor assembly and an interior of the rotor assembly.

3. The rotor assembly of claim 1, further comprising:

a forward bearing assembly disposed proximate the inner radial end of the interstage shaft; and a rearward bearing assembly disposed proximate the downstream end.

4. The rotor assembly of claim 1, wherein the rearward rim end of the first rotor disk is fixedly joined to the distal end of the arm by inertia welding.

5. The rotor assembly of claim 1, further comprising:

a compressor section of the gas turbine engine;

the rotor assembly disposed within the compressor section.

6. The rotor assembly of claim 5, wherein:

the compressor section includes a high pressure compressor;

the rotor assembly disposed within the high pressure compressor.

7. The rotor assembly of claim 1, wherein the each of the plurality of rotor disks comprise a bladed stage of the rotor assembly.

8. The rotor assembly of claim 1, wherein the airfoil is integrally formed with a respective one of the plurality of rotor disks.

9. The rotor assembly of claim 1, wherein:

the plurality of rotor disks comprise a third rotor disk, the third rotor disk disposed axially aft of the first rotor disk and the second rotor disk, the second rotor disk including a coupling end, the third rotor disk including a coupling element;

wherein the coupling end of the second rotor disk engages the coupling element of the third rotor disk.

10. The rotor assembly of claim 9, further comprising:

a rearward shaft joined to the third rotor disk, the rearward shaft including a rearward shaft outer radial end and a rearward shaft inner radial end, the rearward shaft extending axially along and circumferentially about the central axis, the rearward shaft tapering radially inward from the rearward shaft outer radial end to the rearward shaft inner radial end, the rearward shaft inner radial end disposed at the downstream end;

a tie shaft extending axially along and circumferentially about the central axis and coupled to the upstream end and the downstream end.

11. The rotor assembly of claim 1, wherein the arm extends circumferentially about the central axis, encircling at least a portion of the interstage shaft.

12. The rotor assembly of claim 1, where the forward rim end of the first rotor disk comprises a knife edge seal.

13. The rotor assembly of claim 1, wherein a load path of the rotor assembly is directed from the second rotor disk into the interstage shaft and away from the first rotor disk.

14. A rotor assembly for a gas turbine engine, comprising:

a first bladed rotor stage extending axially along and circumferentially about a centerline;

a second bladed rotor stage extending axially along and circumferentially about the centerline, the second bladed rotor stage axially aft of the first bladed rotor stage;

an interstage shaft including an outer radial end and an inner radial end, the interstage shaft extending axially along and circumferentially about the centerline, the interstage shaft extending from an upstream end of the second bladed rotor stage towards the first bladed rotor stage, the interstage shaft tapering radially inward from the outer radial end to the inner radial end, the interstage shaft including an arm extending axially from the outer radial end of the interstage shaft towards the first bladed rotor stage, the first bladed rotor stage fixedly joined to the arm, and the arm disposed between the outer radial end and the inner radial end.

15. The rotor assembly of claim 14, wherein the first bladed rotor stage is fixedly joined to the arm by inertia welding.

16. The rotor assembly of claim 14, further comprising:

a compressor section of the gas turbine engine;

the rotor assembly disposed within the compressor section.

17. The rotor assembly of claim 16, wherein:

the compressor section includes a high pressure compressor;

the rotor assembly disposed within the high pressure compressor.

18. The rotor assembly of claim 14, further comprising:

a third bladed rotor stage axially downstream of the first bladed rotor stage and the second bladed rotor stage, the third bladed rotor stage coupled to a downstream end of the second bladed rotor stage;

wherein the third bladed rotor stage is removably coupled to the second bladed rotor stage.

19. A compressor rotor assembly for a gas turbine engine, comprising:

a compressor section including an upstream end and a downstream end;

a forward bearing assembly at the upstream end;

a rearward bearing assembly at the downstream end;

a plurality of rotor stages extending axially along and circumferentially about an axial centerline between the upstream end and the downstream end, each of the plurality of rotor stages extending radially between an inner radial hub and an outer radial rim, each of the plurality of rotor stages including an airfoil extending spanwise from the outer radial rim to a tip, the plurality of rotor stages comprising a first rotor stage and a second rotor stage, the first rotor stage disposed forward the second rotor stage, the second rotor stage including an interstage shaft;

the interstage shaft including an outer radial end and an inner radial end, the interstage shaft extending axially between the first rotor stage and the second rotor stage, the outer radial end extending axially from an upstream end of the second rotor stage, the interstage shaft tapering radially inward from the outer radial end to the inner radial end, the interstage shaft including an arm extending axially from the interstage shaft as the interstage shaft tapers radially inward towards the inner radial end, the arm extending axially towards the downstream end of the first rotor stage, and the first rotor stage attached to the arm;

wherein a stack load path of the compressor rotor assembly is directed into the interstage shaft and away from the first rotor stage.

20. The compressor rotor assembly of claim 19, wherein the first rotor stage is attached to the arm extending axially from the interstage shaft by inertia welding.

* * * * *